United States Patent
Lee et al.

(10) Patent No.: US 11,370,436 B2
(45) Date of Patent: Jun. 28, 2022

(54) VEHICLE CONTROLLER, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Byoung Joon Lee, Suwon-si (KR); Jin Kwon Kim, Suwon-si (KR); Seong Sook Ryu, Seoul (KR); Sam Yong Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 380 days.

(21) Appl. No.: 16/667,584

(22) Filed: Oct. 29, 2019

(65) Prior Publication Data
US 2020/0255013 A1   Aug. 13, 2020

(30) Foreign Application Priority Data
Feb. 13, 2019  (KR) .................. 10-2019-0016590

(51) Int. Cl.
| | |
|---|---|
| *B60W 30/18* | (2012.01) |
| *B60Q 1/50* | (2006.01) |
| *B60Q 5/00* | (2006.01) |
| *G06F 3/01* | (2006.01) |
| *G06V 20/59* | (2022.01) |

(Continued)

(52) U.S. Cl.
CPC ............ *B60W 30/18* (2013.01); *B60Q 1/50* (2013.01); *B60Q 5/005* (2013.01); *G06F 3/017* (2013.01); *G06V 20/58* (2022.01); *G06V 20/597* (2022.01); *H04W 4/40* (2018.02);
(Continued)

(58) Field of Classification Search
CPC ............ B60W 30/18; B60W 2554/00; B60W 2720/106; B60W 10/04; B60W 10/18; B60W 10/20; B60W 30/09; B60W 30/0956; B60W 50/082; B60W 50/14; B60W 2540/215; B60W 2540/225; B60W 2554/4041; B60W 30/18163; B60W 30/18009; B60W 30/08; B60W 30/14; B60W 40/08; B60W 40/10; B60W 50/10; B60W 2050/143; B60W 2420/42; B60W 2420/52; B60Q 1/50; B60Q 5/005; G06F 3/017; G06V 20/58; G06V 20/597; G06V 2201/08; G06V 40/113; H04W 4/40; B60R 1/06; B60R 21/0134; G01S 13/931; B60Y 2300/08
See application file for complete search history.

(56) References Cited

U.S. PATENT DOCUMENTS

| | | | |
|---|---|---|---|
| 2016/0214618 A1* | 7/2016 | Wulf ................. | B60Q 9/00 |
| 2018/0354489 A1* | 12/2018 | Stayton .............. | G05D 1/0231 |

(Continued)

*Primary Examiner* — Frederick M Brushaber
(74) *Attorney, Agent, or Firm* — Morgan, Lewis & Bockius LLP (57) ABSTRACT

A vehicle controller, a system including the same, and a method thereof are provided. The vehicle controller includes a processor that detect an intervening vehicle based on a line of sight direction of a user; and respond to the intervening vehicle based on an intent of the user when the intervening vehicle is detected; and a storage configured to store information regarding the line of sight direction of the user or the detected intervening vehicle.

20 Claims, 8 Drawing Sheets

(51) Int. Cl.

| | |
|---|---|
| *H04W 4/40* | (2018.01) |
| *B60W 10/04* | (2006.01) |
| *B60W 10/18* | (2012.01) |
| *B60W 10/20* | (2006.01) |
| *B60W 50/14* | (2020.01) |
| *B60R 1/06* | (2006.01) |
| *G06V 20/58* | (2022.01) |

(52) U.S. Cl.
 CPC ... *B60W 2554/00* (2020.02); *B60W 2720/106* (2013.01); *G06V 2201/08* (2022.01)

(56) References Cited

U.S. PATENT DOCUMENTS

2019/0066506 A1* 2/2019 Kazemi .................. G08G 1/166
2019/0187790 A1* 6/2019 Woo ...................... B60W 40/08

\* cited by examiner

VEHICLE CONTROLLER, SYSTEM INCLUDING THE SAME, AND METHOD THEREOF

CROSS-REFERENCE TO RELATED APPLICATION

The present application claims priority to and the benefit of Korean Patent Application No. 10-2019-0016590, filed on Feb. 13, 2019, which is incorporated herein by reference in its entirety.

TECHNICAL FIELD

The present disclosure relates to a vehicle controller, a system including the same, and a method thereof, and more particularly, relates to technologies corresponding to a vehicle intervening (cutting in).

BACKGROUND

The statements in this section merely provide background information related to the present disclosure and may not constitute prior art.

For the convenience of a driver, various functions, such as autonomous driving, for assist the driver have been developed and used. There is a smart cruise control (SCC) system which control to keep an inter-vehicle distance between a host vehicle and a forward vehicle constant among such functions for assisting the driver. The SCC system detects that a vehicle on a lane adjacent to the host vehicle is trying to cut in within a short range, using its mono-camera or its radar.

However, as a time when the vehicle intervening is recognized becomes late because a field of view (FOV) of the mono-camera or the radar is narrow, the SCC system may perform sudden deceleration control or the like for avoiding a collision with the vehicle intervening to reduce the riding quality of the driver.

Furthermore, when the driver recognizes a situation where there is a vehicle intervening earlier than the SCC system, he or she directly brakes at the beginning of trying to cut in to avoid the reduction of a riding quality due to rapid deceleration. When the driver attempts to brake, as an inter-vehicle system is released and is activated again, because the inter-vehicle system is turned repeatedly on/off, an unintended unnecessary process is performed.

In addition, except that, when the driver attempts to cut in on an adjacent lane, he or she directly pushes the gas pedal as much as he or she needs to temporarily perform manual driving, the conventional inter-vehicle distance system does not have a function of not permitting the intervening, causing the inconvenience of the driver.

SUMMARY

An aspect of the present disclosure provides a vehicle controller for early detecting a vehicle intervening based on a line of sight direction of a user to prevent sudden deceleration control of a vehicle and controlling to correspond to the vehicle intervening depending on a corresponding intent of the user, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

In some forms of the present disclosure, a vehicle controller may include: a processor that detect an intervening vehicle based on a line of sight direction of a user; and respond to the intervening vehicle based on an intent of the user when the intervening vehicle is detected; and a storage configured to store information regarding the line of sight direction of the user or the detected intervening vehicle.

The processor may determine that the user attends to the intervening vehicle when: the user attends to a predetermined area or a predetermined direction for a predetermined amount of time; a summation of time that the user attends to the predetermined area or the predetermined direction for the predetermined amount of time is greater than or equal to a predetermined value; or a gaze pattern matches to a vehicle gaze pattern that is previously learned and output by a learning algorithm.

The predetermined area or the predetermined direction may include an outer direction including a side mirror area at a driver seat or a passenger seat.

The processor may set an area where the intervening vehicle is located as a candidate area for the intervening vehicle; and detect the intervening vehicle in the candidate area when the user is determined to attend to the intervening vehicle.

The processor may detect the intervening vehicle from a time that a part of the intervening vehicle is detected within a field of view (FOV) of a camera of the vehicle; and detect the intervening vehicle based on an optical flow within image frames or a pattern recognition of front tires.

The processor may detect the intervening vehicle by detecting a signal of a turn signal of the intervening vehicle in the candidate area.

The processor may detect the intervening vehicle from the time that the part of the intervening vehicle enters a radar range of the vehicle; and detecting the intervening vehicle based on an amount of all reflected radio waves.

The processor may determine the intent of the user based on a switch input from the user or a gesture input of the user.

The processor may detect the intervening vehicle at a predetermined control time when the user is determined not to attend to the intervening vehicle based on the line of sight direction of the user.

The processor may decelerate the vehicle at a time earlier than the predetermined control time when the user intends to yield to the intervening vehicle.

The processor may provide a warning to the intervening vehicle and accelerate the vehicle to reduce a distance from a forward vehicle when the user does not intend to yield to the intervening vehicle.

The processor may provide the warning to the intervening vehicle using at least one of a high beam, a warning sound, a horn, or a message through a vehicle-to-everything (V2X) communication.

In another aspect of the present disclosure, a vehicle system may include: a sensor configured to sense a intervening vehicle or a line of sight direction of a user; and a vehicle controller configured to: detect the intervening vehicle based on the line of sight direction of the user; and respond to the intervening vehicle based on an intent of the user when the intervening vehicle is detected.

The vehicle system may further include a warning device configured to output a warning sound or a warning text when a warning is provided to the intervening vehicle.

In another aspect of the present disclosure, a vehicle control method may include: sensing a intervening vehicle or a line of sight direction of a user; detecting the intervening vehicle based on the line of sight direction of the user; receiving an intent of the user when the intervening vehicle is detected; and responding to the intervening vehicle based on the intent of the user.

The detecting the intervening vehicle based on the line of sight direction of the user may include detecting the intervening vehicle when the user attends to the intervening vehicle; and detecting the intervening vehicle at a predetermined point of time when the user does not attend to the intervening vehicle.

The determining that the user attends to the intervening vehicle may include determining that the user attends to the intervening vehicle when the user attends to a predetermined area or a predetermined direction for a predetermined amount of time; a summation of time that the user attends to the predetermined area or the predetermined direction for the predetermined amount of time is greater than or equal to a predetermined value; or a gaze pattern matches to a vehicle gaze pattern that is previously learned and output by a learning algorithm.

The predetermined area or direction comprises an outer direction including a side mirror area at a driver seat or a passenger seat.

The intervening vehicle when the user attends to the intervening vehicle may include setting an area where the intervening vehicle is located as a candidate area for the intervening vehicle; detecting the intervening vehicle from a time that a part of the intervening vehicle is detected within a field of view (FOV) of a camera of the vehicle in the candidate area; detecting the intervening vehicle based on an optical flow within image frames or a pattern recognition of front tires; detecting the intervening vehicle by detecting a signal of a turn signal of the intervening vehicle in the candidate area; detecting the intervening vehicle from a time that the part of the intervening vehicle enters a radar range of the vehicle; and detecting the intervening vehicle based on an amount of all reflected radio waves.

The receiving the intent of the user comprises determining the intent of the user based on a switch input from the user or a gesture input of the user.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the components of some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In some forms of the present disclosure, when there is a vehicle intervening (cutting in) while a smart cruise control (SCC) function is enabled, early recognizing the vehicle intervening and corresponding to the vehicle intervening to prevent sudden deceleration control or the like and correspond to the vehicle intervening depending on a corresponding intent of a user.

Hereinafter, a description will be given in some forms of the present disclosure with reference to FIGS. 1 to 7.

Figure 1:
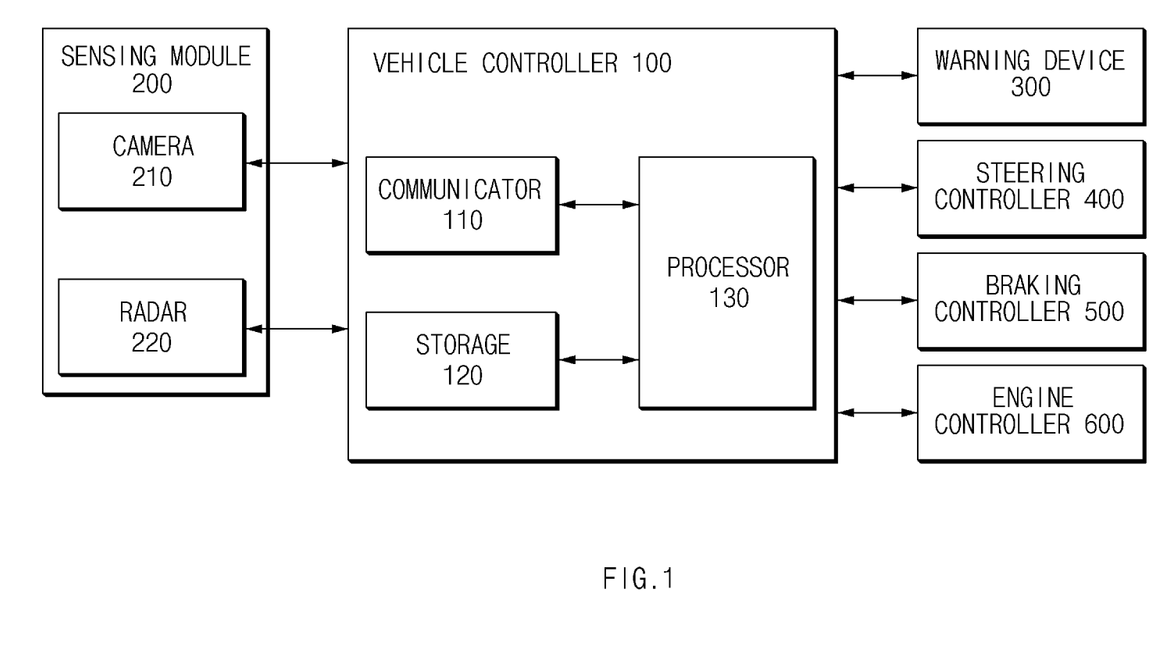
FIG. 1 is a block diagram illustrating a configuration of a vehicle system including a vehicle controller in one form of the present disclosure.
Figure 2A:
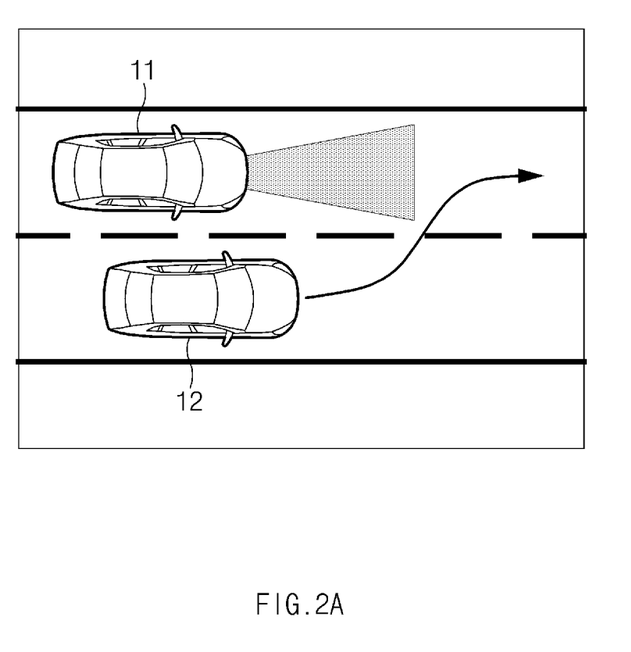
FIG. 2A is a drawing illustrating a vehicle which is trying to cut in one form of the present disclosure.
Figure 2B:
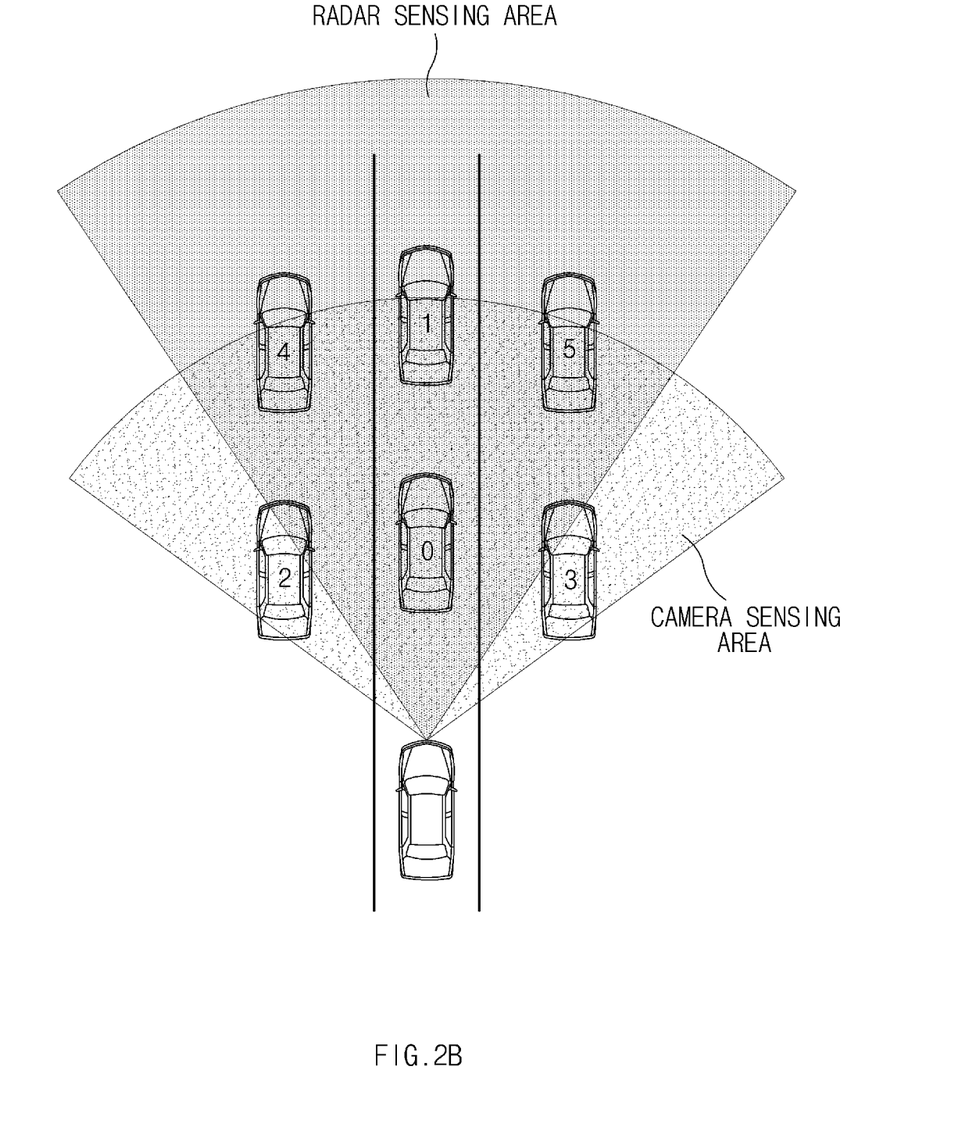
FIG. 2B is a drawing illustrating a radar sensing area and a camera sensing area in one form of the present disclosure.

FIG. 1 is a block diagram illustrating a configuration of a vehicle system including a vehicle controller in some forms of the present disclosure. FIG. 2A is a drawing illustrating a vehicle which is trying to cut in some forms of the present disclosure. FIG. 2B is a drawing illustrating a radar sensing area and a camera sensing area in some forms of the present disclosure.

Referring to FIG. 1, the vehicle system in some forms of the present disclosure may include a vehicle controller 100, a sensing module 200, a warning device 300, a steering controller 400, a braking controller 500, and an engine controller 600.

As shown in FIG. 2A, a vehicle 12 which is traveling on a lane adjacent to a lane where a host vehicle 11 is traveling cuts in on the lane where the host vehicle 11 is traveling, as shown in FIG. 2B, the vehicle controller 100 may detect the vehicle 12 intervening using a radar and a camera in the host vehicle 11 and may perform vehicle control to correspond to the vehicle 12 intervening.

The vehicle controller 100 may detect a vehicle intervening (cutting in), based on a line of sight direction of a user and may control to correspond to the vehicle intervening depending on a corresponding intent of the user when detecting the vehicle which cuts in. In some forms of the present disclosure, the vehicle controller 100 may include a smart cruise control (SCC) function for controlling am inter-vehicle distance from a forward vehicle. When it is determined that the user does not look at the vehicle intervening based on a line of sight direction of the user, the vehicle controller 100 may starts to detect the vehicle intervening at a time preset by the SCC function (e.g., when the entire rear form of the vehicle intervening is in a field of view (FOV) of a camera, at a time when the entire rear form is identical to a rear image pattern of the vehicle). However, when it is determined that the user looks at the vehicle intervening based on the line of sight direction of the user, the vehicle controller 100 may immediately start to detect the vehicle intervening, although it does not reaches the time preset by the SCC function, to correspond to the vehicle intervening. Because some forms of the present disclosure may be faster in a time to detect the vehicle intervening than an existing technique to prevent sudden deceleration upon corresponding to the vehicle intervening.

The vehicle controller 100 may include a communicator 110, a storage 120, and a processor 130.

The communicator 110 may be a hardware device implemented with various electronic circuits to transmit and receive a signal over a wireless or wired connection. In some forms of the present disclosure, the communicator 110 may perform inter-vehicle communication through controller area network (CAN) communication, local interconnect network (LIN) communication, or the like and may perform vehicle-to-everything (V2X) communication with surrounding vehicles.

The storage 120 may store the result of detecting a surrounding vehicle, the result of detecting a vehicle intervening, the result of determining the vehicle intervening by the processor 130, or the like. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communicator 110 and the storage 120 and may electrically control the respective components. The processor 130 may be an electrical circuit which executes instructions of software and may perform a variety of data processing and calculation described below.

In case of one or more of 1) when the user looks at a predetermined area or direction beyond a predetermined time, 2) when the sum of times when the user looks at the predetermined area or direction within the predetermined time is greater than or equal to a predetermined reference value, and 3) when there is a vehicle gaze pattern identical to a vehicle gaze pattern previously learned and output by a learning algorithm, the processor 130 may determine that the user looks at a vehicle intervening.

In this case, the predetermined area or direction may include an outer direction including a side mirror direction at the driver's seat or a direction outside the passenger seat (outside a center fascia at the passenger seat).

When it is determined that the user looks at the vehicle intervening, the processor 130 may set an area where the vehicle intervening is located as a candidate region where there is the vehicle intervening and may detect the vehicle intervening in the candidate region.

The processor 130 may detect whether there is the vehicle intervening from a time when a part of the vehicle intervening is seen in a field of view (FOV) of a camera 210. The processor 130 may detect whether there is the vehicle intervening, based on optical flow between image frames or front tire pattern recognition.

The processor 130 may detect a signal of a turn signal of the vehicle intervening in the candidate region where there is the vehicle intervening to detect whether there is the vehicle intervening.

The processor 130 may detect whether there is the vehicle intervening from a time when a part of the vehicle intervening enters a detection range of the radar 220. The processor 130 may detect whether there is the vehicle intervening for an amount of all reflected radio waves. In other words, although an amount of reflected radio waves is very small, the processor 130 may recognize the reflected radio waves as the vehicle intervening without neglecting the reflected radio waves.

The processor 130 may determine a corresponding intent of the user depending on a switch input from the user or a gesture input of the user.

When it is determined that the user does not look at the vehicle intervening based on a line of sight direction of the user, the processor 130 may detect the vehicle intervening at a predetermined control time (a time set by an existing SCC function).

When an intent to yield to the vehicle intervening is input by the user, the processor 130 may perform vehicle deceleration control at a time earlier than the predetermined control time. Furthermore, when an intent to prevent the vehicle intervening is input by the user, the processor 130 may provide a warning to the vehicle intervening and may perform acceleration control to reduce an inter-vehicle distance from a forward vehicle.

The processor 130 may provide a warning using at least one or more of ON/OFF of a high beam, an output of a warning sound, an output of a horn, and transmission of a warning message through V2X communication. In this case, the output of the warning sound and an output of warning text may be performed via the warning device 300. A warning message may be transmitted to the vehicle intervening via the communicator 110.

As such, the vehicle control device 100 in some forms of the present disclosure may prevent sudden deceleration control when there a vehicle intervening on a lane where a host vehicle is traveling. The vehicle controller 100 may perform vehicle control to allow the vehicle intervening to cut in on the lane, when the user wants to yield to the vehicle intervening, and may perform vehicle control not to allow the vehicle intervening to cut in on the lane, when the user does not want to yield to the vehicle intervening, thus increasing satisfaction of the user.

The sensing module 200 may include a plurality of sensors to sense a vehicle around a host vehicle and may obtain information associated with a location of the vehicle around the host vehicle, a speed of the vehicle around the host vehicle, a movement direction of the vehicle around the host vehicle, and/or a type (e.g., a sedan, a compact car, a mid-size car, a full-size car, or the like) of the vehicle around the host vehicle. To this end, the sensing module 200 may include the camera 210 and the radar 220 and may include an ultrasonic sensor, a laser scanner and/or a corner radar, a light detection and ranging (LiDAR), an acceleration sensor, a yaw rate sensor, a torque sensor and/or a wheel speed sensor, a steering angle sensor, or the like. In some forms of the present disclosure, it may be seen that the sensing module 200 senses whether a surround vehicle cuts in on a warning area and a dangerous area, a degree to which the surrounding vehicle cuts in on them, or the like. In this case, the camera 210 may be implemented as an around view monitoring (AVM) camera (optional).

The warning device 300 may output a warning sound, warning text, and the like. To this end, the warning device 300 may include a display for outputting warning text. The warning device 300 may be implemented as a head-up display (HUD), a cluster, an audio video navigation (AVN), or the like. Furthermore, the warning device 300 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and a three-dimensional (3D) display. Some thereof may be implemented as transparent displays configured as a transparent type or a semi-transparent type to see the outside. Moreover, the warning device 300 may be implemented as a touchscreen including a touch panel to be used as an input device other than an output device.

Furthermore, the warning device 300 may receive a corresponding intent for corresponding to the vehicle intervening via the touchscreen from the user.

The steering controller 400 may be configured to control a steering angle of the vehicle and may include a steering wheel, an actuator interlocked with the steering wheel, and a controller for controlling the actuator.

The braking controller 500 may be configured to control braking of the vehicle and may include a controller for controlling a brake.

The engine controller 600 may be configured to control to drive an engine of the vehicle and may include a controller for controlling a speed of the vehicle.

As such, some forms of the present disclosure may use a sensing device used in an existing SCC system without change and early detect the vehicle intervening when a line of sight of the user who looks at the vehicle intervening is detected to prevent sudden deceleration control and may correspond to the vehicle intervening depending on a corresponding intent of the user to increase convenience of the user.

Figure 3:
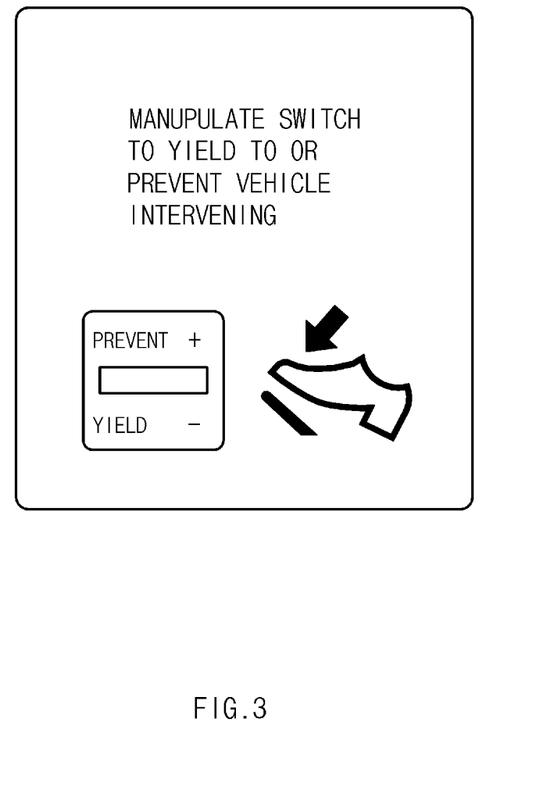
FIG. 3 is a drawing illustrating a screen for receiving a corresponding intention from a user in one form of the present disclosure.

FIG. 3 is a drawing illustrating a screen for receiving a corresponding intention from a user in some forms of the present disclosure. In FIG. 3, a screen for guiding a user to input his or her corresponding intent for corresponding to a vehicle intervening by using a switch may be displayed. A sound may be output concurrently with outputting the screen.

Figure 4:
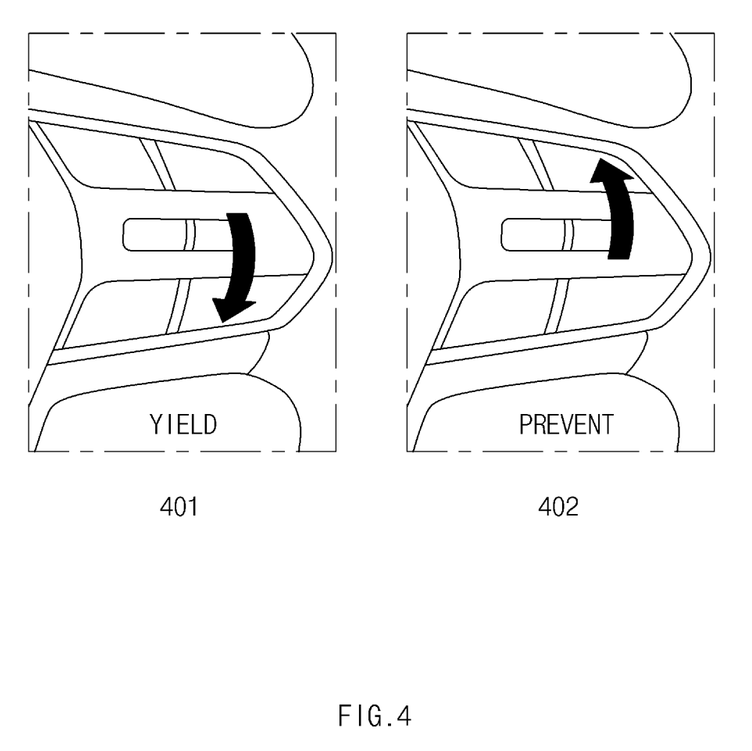
FIG. 4 is an exemplary drawing illustrating determining a corresponding intent of a user according to a switch input of the user in one form of the present disclosure.

FIG. 4 is an exemplary drawing illustrating determining a corresponding intent of a user according to a switch input of the user in some forms of the present disclosure. In FIG. 4, an example of a switch operation is disclosed as a user input. Reference numeral 401 refers to the indication of an intent of a user to yield to a vehicle intervening when the user manipulates the switch down such that the vehicle intervening may cut in. Reference numeral 402 refers to the indication of an intent of the user to prevent the vehicle intervening when the user manipulates the switch up (prevent the vehicle intervening from intervening.

Figure 5:
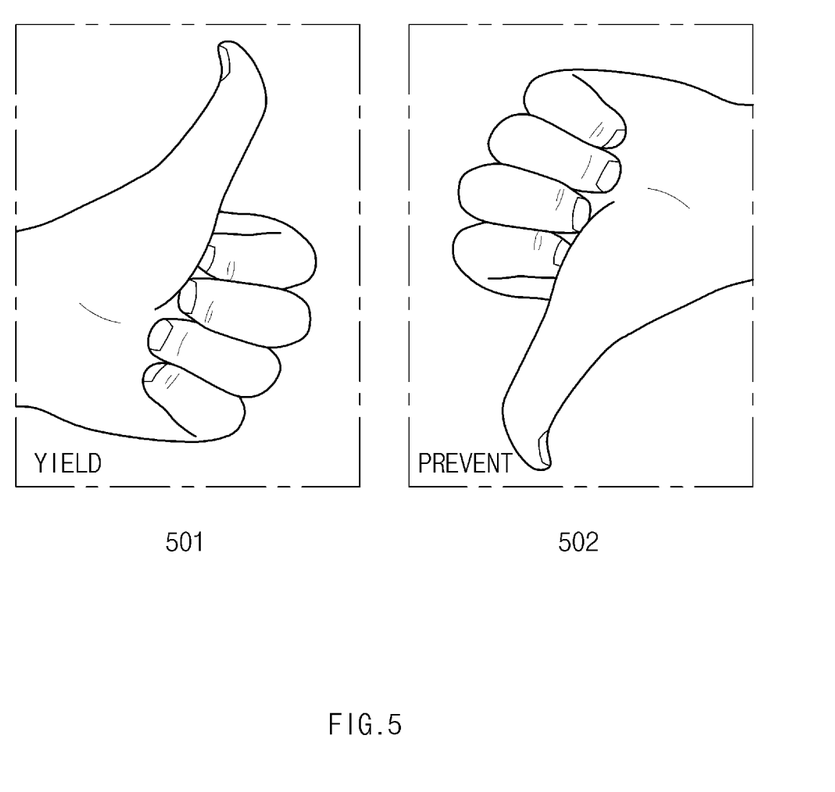
FIG. 5 is an exemplary drawing illustrating determining a corresponding intent of the user according to a gesture input of the user in one form of the present disclosure.

FIG. 5 is an exemplary drawing illustrating determining a corresponding intent of the user according to a gesture input of the user in some forms of the present disclosure. In FIG. 5, a gesture is recognized as a user input. When a user's thumb is up like reference numeral 501, an intent to yield to a vehicle intervening may be input. When the user's thumb is down like reference numeral 502, an intent to prevent the vehicle intervening may be input. In this case, the example of the gesture is not limited to the form of FIG. 5. Various gestures may be set to receive a corresponding intent of the user. The switch or the gesture as an example of the user input method is, but is not limited to, the form described herein. For example, a vehicle controller 100 of FIG. 1 may receive a corresponding intent of the user in various manners.

Figure 6:
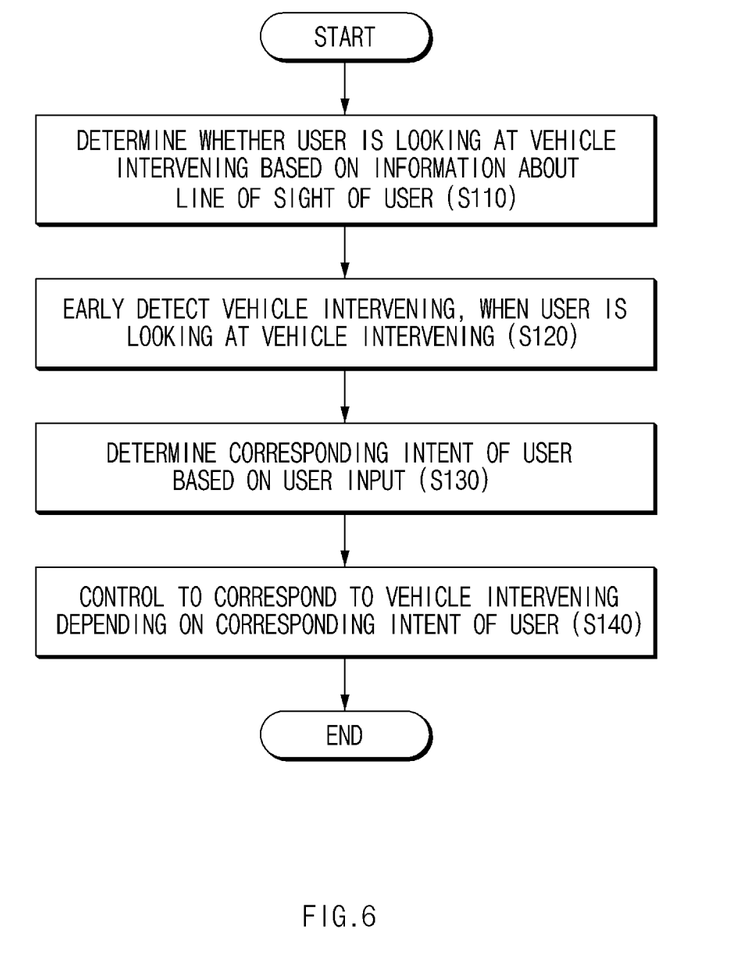
FIG. 6 is a flowchart illustrating a vehicle control method for corresponding to a vehicle intervening in one form of the present disclosure.

Hereinafter, a description will be given in detail of a vehicle control method for corresponding to a vehicle intervening some forms of the present disclosure. FIG. 6 is a flowchart illustrating a vehicle control method for corresponding to a vehicle intervening in some forms of the present disclosure.

Hereinafter, it is assumed that a vehicle controller 100 of FIG. 1 performs a process of FIG. 6. Furthermore, in a description of FIG. 6, an operation described as being performed by an apparatus may be understood as being controlled by a processor 130 of the vehicle controller 100.

In S110, the vehicle controller 100 may determine whether a user is looking at a vehicle intervening, based on information about a line of sight of the user. In other words, the vehicle controller 100 may determine whether the user is looking at the vehicle intervening, which is close to a lane where a host vehicle is traveling from a lane at the left or right of the host vehicle.

Furthermore, in case of one or more of 1) when the user looks at a predetermined area or direction beyond a predetermined time, 2) when the sum of times when the user looks at the predetermined area or direction within the predetermined time is greater than or equal to the predetermined time, or 3) after consecutive values of a face direction or a line of sight direction of the user during the predetermined time are learned using machine learning which is a learning algorithm to output a pattern where the user looks at a left/right vehicle intervening as a result of the learning, when the output pattern is identical to a previously stored vehicle gaze pattern, the vehicle controller 100 may determine that the user looks at the vehicle intervening.

Herein, the predetermined area or direction may include an outer direction where a face direction of the user or a line of sight of the user includes a side mirror area at the driver's seat or a direction outside a center fascia at the passenger seat.

When the user looks at the vehicle intervening, in S120, the vehicle controller 100 may early detect the vehicle intervening. When it is determined that the user is looking at the vehicle intervening, the vehicle controller 100 may set a candidate area where there is the vehicle intervening in the direction the user looks at and may actively detect whether there is the vehicle intervening using optical flow between image frames, front tire pattern recognition, or the like from a time when a part of the vehicle intervening in a field of view (FOV) of a camera 210 of FIG. 1 is seen in the candidate area, thus tracking and determining whether the detected vehicle is close to a lane where the host vehicle is traveling. In the related art, when most of a rear form of a vehicle intervening enters an FOV of a camera, the vehicle intervening is detected using a method for recognizing a rear image pattern of a vehicle, because it starts to recognize the detected vehicle as the vehicle intervening after certain frames should be consecutively detected for verification, the detection time becomes late. In some forms of the present disclosure, the vehicle controller 100 may detect whether there is a vehicle intervening at a time when a part of the vehicle is seen or through front tire pattern recognition to faster detect the vehicle intervening.

Furthermore, the vehicle controller 100 may detect a signal of a turn signal in the direction where the vehicle intervening is located to determine whether there is the vehicle intervening.

Furthermore, in the related art, a vehicle on an FOV while intervening is ignored because the amount of reflected radio waves is small to prevent error detection. Although the amount of radio waves reflected from when a part of a vehicle intervening enters a detection range of a radar 220 of FIG. in front of the vehicle is small, the vehicle controller 100 in some forms of the present disclosure may actively detect whether there the vehicle intervening.

When the vehicle intervening is early detected, in S130, the vehicle controller 100 may determine a corresponding intent of the user based on a user input.

The vehicle controller 100 may display a screen shown in FIG. 3 to guide the user to provide an input. FIG. 3 is a drawing illustrating a notification screen for receiving a user input for corresponding to a vehicle intervening by using a switch. The vehicle controller 100 may output a notification for receiving a user input as a sound and on a screen by means of the warning device 300 in some forms of the present disclosure.

The corresponding intent of the user may include a request of the user for whether the user will yield to a vehicle intervening whether the user will prevent the vehicle intervening from intervening.

In FIG. 4, an example of a switch operation is disclosed as a user input. Reference numeral 401 refers to the indication of an intent of the user to yield to a vehicle intervening when the user manipulates the switch down such that the vehicle intervening may cut in. Reference numeral 402 refers to the indication of an intent of the user to prevent the vehicle intervening when the user manipulates the switch up (prevent the vehicle intervening from intervening).

In FIG. 5, a gesture is recognized as a user input. When a user's thumb is up like reference numeral 501, an intent to yield to a vehicle intervening may be input. When the user's thumb is down like reference numeral 502, an intent to prevent the vehicle intervening may be input.

When the corresponding intent of the user is determined, in S140, the vehicle controller 100 may control to correspond to the vehicle intervening depending on the corresponding intent of the user. When the intent of the user to yield to the vehicle intervening is input, because the time to recognize the vehicle intervening is faster than an existing technique, the vehicle controller 100 may expect a longitudinal distance after the intervening is completed and may perform slow deceleration control in advance at a time earlier than a time when an existing SCC function is controlled not to perform rapid deceleration.

On the other hand, when the intent of the user to prevent intervening is input, the vehicle controller 100 may output an intention not to yield to the vehicle intervening using ON/OFF of a high beam and may perform acceleration control to temporarily minimize a distance gap between the host vehicle and a forward vehicle (a preceding vehicle) not to yield to the vehicle intervening. For example, the vehicle controller 100 may perform control from a current fourth stage (with the longest inter-vehicle distance) in an inter-vehicle setting of an SCC function to a first stage (with the shortest inter-vehicle distance) and may control to return to a setting value (the fourth stage) after a predetermined time expires.

As such, some forms of the present disclosure may early e vehicle intervening and may prevent sudden deceleration control to optimize the riding quality of the user and may add a function of permit the vehicle intervening only when the user wants to yield to the vehicle intervening, increasing convenience of the user.

Figure 7:
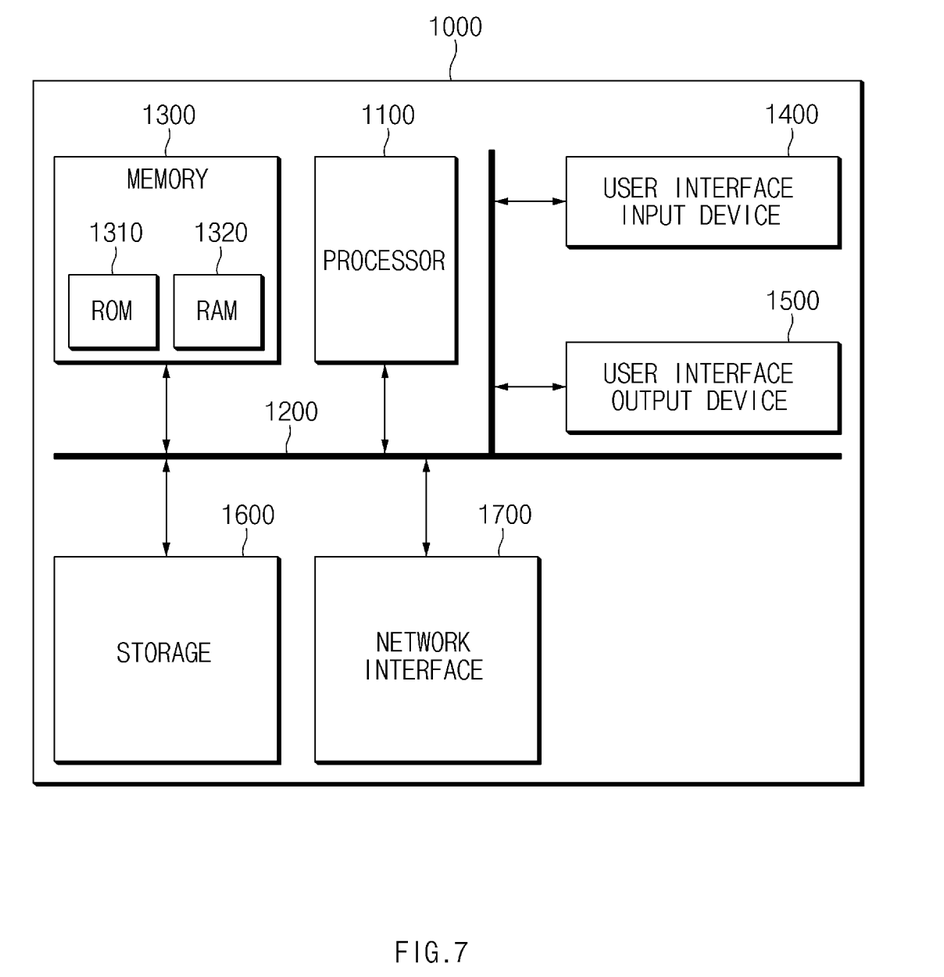
FIG. 7 is a block diagram illustrating a computing system in one form of the present disclosure.

FIG. 7 is a block diagram illustrating a computing system in some forms of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in some forms of the present disclosure disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may early detect a vehicle intervening based on a line of sight direction of the user to prevent sudden deceleration control of the vehicle and may control to correspond to the vehicle intervening depending on a corresponding intent of the user to increase convenience of the user.

In addition, various effects directly or indirectly ascertained through the present disclosure may be provided.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle controller, comprising:
   a processor configured to:
   detect an intervening vehicle into a front of an own vehicle based on a line of sight direction of a user during autonomous driving; and
   respond to the intervening vehicle based on an intent of the user including whether to yield to the intervening vehicle when the intervening vehicle is detected; and a storage configured to store information regarding the line of sight direction of the user or the detected intervening vehicle.

2. The vehicle controller of claim 1, wherein the processor is configured to: determine that the user attends to the intervening vehicle when:
the user attends to a predetermined area or a predetermined direction for a predetermined amount of time;
a summation of time that the user attends to the predetermined area or the predetermined direction for the predetermined amount of time is greater than or equal to a predetermined value; or
a gaze pattern matches to a vehicle gaze pattern that is previously learned and output by a learning algorithm.

3. The vehicle controller of claim 2, wherein the predetermined area or the predetermined direction comprises:
an outer direction including a side mirror area at a driver seat or a passenger seat.

4. The vehicle controller of claim 1, wherein the processor is configured to:
set an area where the intervening vehicle is located as a candidate area for the intervening vehicle; and
detect the intervening vehicle in the candidate area when the user is determined to attend to the intervening vehicle.

5. The vehicle controller of claim 4, wherein the processor is configured to:
detect the intervening vehicle from a time that a part of the intervening vehicle is detected within a field of view (FOV) of a camera of the vehicle; and
detect the intervening vehicle based on an optical flow within image frames or a pattern recognition of front tires.

6. The vehicle controller of claim 4, wherein the processor is configured to: detect the intervening vehicle by detecting a signal of a turn signal of the intervening vehicle in the candidate area.

7. The vehicle controller of claim 4, wherein the processor is configured to:
detect the intervening vehicle from the time that the part of the intervening vehicle enters a radar range of the vehicle; and
detecting the intervening vehicle based on an amount of all reflected radio waves.

8. The vehicle controller of claim 1, wherein the processor is configured to:
determine the intent of the user based on a switch input from the user or a gesture input of the user.

9. The vehicle controller of claim 1, wherein the processor is configured to:
detect the intervening vehicle at a predetermined control time when the user is determined not to attend to the intervening vehicle based on the line of sight direction of the user.

10. The vehicle controller of claim 9, wherein the processor is configured to:
decelerate the vehicle at a time earlier than the predetermined control time when the user intends to yield to the intervening vehicle.

11. The vehicle controller of claim 1, wherein the processor is configured to:
provide a warning to the intervening vehicle and accelerate the vehicle to reduce a distance from a forward vehicle when the user does not intend to yield to the intervening vehicle.

12. The vehicle controller of claim 11, wherein the processor is configured to:
provide the warning to the intervening vehicle using at least one of a high beam, a warning sound, a horn, or a message through a vehicle-to-everything (V2X) communication.

13. A vehicle system, comprising:
a sensor configured to sense an intervening vehicle into a front of an own vehicle or a line of sight direction of a user during autonomous driving; and
a vehicle controller configured to:
detect the intervening vehicle based on the line of sight direction of the user; and
respond to the intervening vehicle based on an intent of the user including whether to yield to the intervening vehicle when the intervening vehicle is detected.

14. The vehicle system of claim 13, further comprising:
a warning device configured to output a warning sound or a warning text when a warning is provided to the intervening vehicle.

15. A vehicle control method, comprising:
sensing an intervening vehicle or a line of sight direction of a user;
detecting the intervening vehicle into a front of an own vehicle based on the line of sight direction of the user during autonomous driving;
receiving an intent of the user including whether to yield to the intervening vehicle when the intervening vehicle is detected; and
responding to the intervening vehicle based on the intent of the user.

16. The vehicle control method of claim 15, wherein detecting the intervening vehicle based on the line of sight direction of the user comprises:
detecting the intervening vehicle when the user attends to the intervening vehicle; and
detecting the intervening vehicle at a predetermined point of time when the user does not attend to the intervening vehicle.

17. The vehicle control method of claim 16, wherein the determining that the user attends to the intervening vehicle comprises:
determining that the user attends to the intervening vehicle when:
the user attends to a predetermined area or a predetermined direction for a predetermined amount of time;
a summation of time that the user attends to the predetermined area or the predetermined direction for the predetermined amount of time is greater than or equal to a predetermined value; or
a gaze pattern matches to a vehicle gaze pattern that is previously learned and output by a learning algorithm.

18. The vehicle control method of claim 17, wherein the predetermined area or direction comprises an outer direction including a side mirror area at a driver seat or a passenger seat.

19. The vehicle control method of claim 16, wherein detecting the intervening vehicle when the user attends to the intervening vehicle comprises:
setting an area where the intervening vehicle is located as a candidate area for the intervening vehicle;
detecting the intervening vehicle from a time that a part of the intervening vehicle is detected within a field of view (FOV) of a camera of the vehicle in the candidate area;
detecting the intervening vehicle based on an optical flow within image frames or a pattern recognition of front tires;

detecting the intervening vehicle by detecting a signal of a turn signal of the intervening vehicle in the candidate area;

detecting the intervening vehicle from a time that the part of the intervening vehicle enters a radar range of the vehicle; and detecting the intervening vehicle based on an amount of all reflected radio waves.

20. The vehicle control method of claim 19, wherein receiving the intent of the user comprises:

determining the intent of the user based on a switch input from the user or a gesture input of the user.

* * * * *